(12) United States Patent
Winkler et al.

(10) Patent No.: US 7,755,232 B2
(45) Date of Patent: Jul. 13, 2010

(54) DC MOTOR WITH SUPPRESSOR

(75) Inventors: Wolfgang Winkler, Schutterwald (DE); Erik Maurer, Buehiertal (DE); Tobias Kuechen, Emmendingen (DE); Fernando Silva, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 11/574,561

(22) PCT Filed: Jul. 19, 2005

(86) PCT No.: PCT/EP2005/053479

§ 371 (c)(1),
(2), (4) Date: Jul. 23, 2007

(87) PCT Pub. No.: WO2006/027290

PCT Pub. Date: Mar. 16, 2006

(65) Prior Publication Data

US 2007/0278877 A1    Dec. 6, 2007

(30) Foreign Application Priority Data

Sep. 6, 2004   (DE) .................. 10 2004 043 593
Sep. 24, 2004  (DE) .................. 10 2004 046 299

(51) Int. Cl.
*H02K 11/00* (2006.01)
(52) U.S. Cl. .................. 310/72; 310/71; 310/51
(58) Field of Classification Search .................. 310/51, 310/71–72, 89, 68 R, 239, 249
See application file for complete search history.

(56) References Cited

U.S. PATENT DOCUMENTS 4,384,223 A      5/1983  Zelt
4,727,274 A *    2/1988  Adam et al. .................. 310/239
4,845,393 A *    7/1989  Burgess et al. ................ 310/51
4,900,966 A *    2/1990  Winter et al. ................ 310/239
5,043,614 A *    8/1991  Yockey ....................... 310/68 D
5,640,062 A *    6/1997  Yockey ....................... 310/68 D
5,656,878 A *    8/1997  Nakata ........................ 310/71
5,734,212 A *    3/1998  Uffelman ..................... 310/51
5,903,072 A *    5/1999  Phillips ....................... 310/51
5,949,173 A *    9/1999  Wille et al. ................... 310/220

(Continued)

FOREIGN PATENT DOCUMENTS

DE       100 14 474      10/2001

(Continued)

*Primary Examiner*—Thanh Lam
(74) *Attorney, Agent, or Firm*—Michael J. Striker

(57) ABSTRACT

A DC motor (1), in particular for a blower device of a motor vehicle, having a pole housing (10), a plurality of contact elements (13) effecting the bonding to a collector (12), a pole housing opening (16) making it possible to feed electrical connection lines (18) through into the pole housing (10), and an interference suppressor (28, 28.1) serving to reduce and/or eliminate line-conducted electrical interference signals, in which the interference suppressor (28, 28.1) has at least one leadthrough capacitor (48), which is located in an electrical path of at least one connection line (18). The invention further relates to an electrical interference suppressor (28, 28.1) for an electrical device located in a housing, in particular for a DC motor (1) in a pole housing (10), as well as to the use of a leadthrough capacitor (48, 48.1) for interference suppression in a DC motor (1).

12 Claims, 3 Drawing Sheets

U.S. PATENT DOCUMENTS

Figure 1:
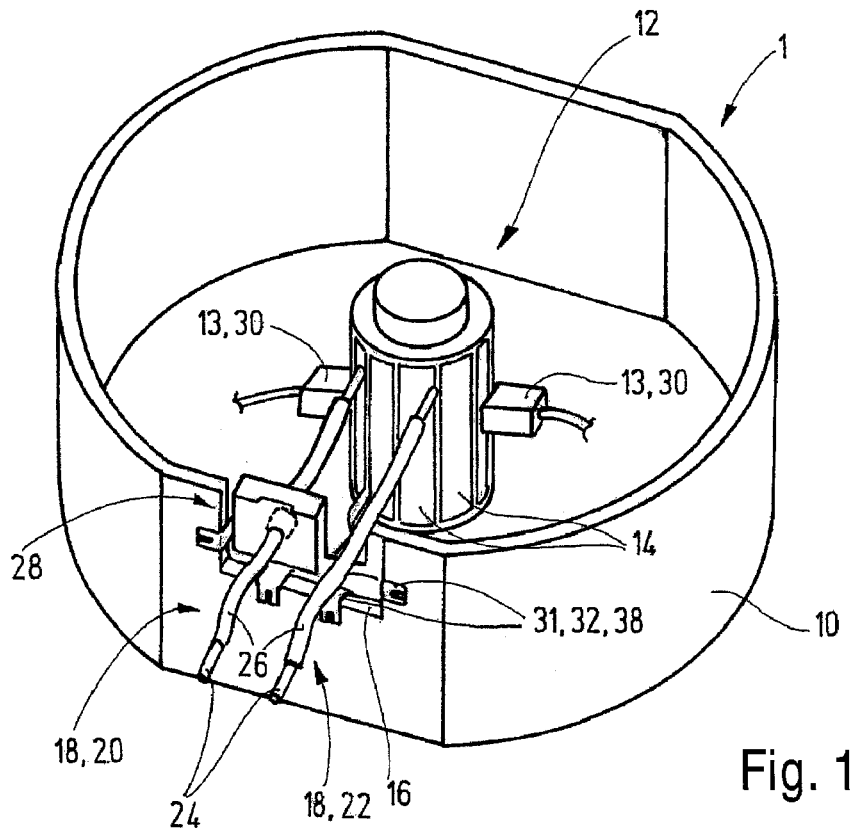

| | | | |
|---|---|---|---|
| 6,037,693 A * | 3/2000 | Marth et al. | 310/220 |
| 6,307,344 B1 | 10/2001 | Pajak et al. | |
| 6,724,122 B2 * | 4/2004 | Frey et al. | 310/238 |
| 6,768,243 B1 | 7/2004 | Yamazaki et al. | |
| 6,982,512 B2 * | 1/2006 | Schuster et al. | 310/148 |
| 7,018,240 B2 * | 3/2006 | Bourdykina et al. | 439/620.02 |
| 7,019,425 B2 | 3/2006 | Langguth et al. | |
| 2003/0007297 A1 | 1/2003 | Herrmann et al. | |

FOREIGN PATENT DOCUMENTS

| | | |
|---|---|---|
| EP | 1 503 484 | 2/2005 |

* cited by examiner

DC MOTOR WITH SUPPRESSOR

The invention relates to a DC motor as generically defined by the preamble to claim 1, in particular for a blower device of a motor vehicle, having a pole housing, a plurality of contact elements effecting the bonding to a collector, and an interference suppressor serving to reduce and/or eliminate line-conducted electrical interference signals.

PRIOR ART

DC motors of the type defined at the outset are known, for instance embodied as two-pole brush DC motors. Such DC motors have many applications, and particularly in the automotive field, they are needed in a design with suppression of electromagnetic interference. It is known to accomplish the interference suppression by locating a plurality of elements between the contact element leads and the "plus" and "minus" motor terminals. For interference suppression in the medium-wave, short-wave, and ultra-short-wave range, a choke is connected in series with each of the contact elements, and for interference suppression in the long-wave range, a capacitor is connected parallel to the contact element leads. It is disadvantageous, however, that such an arrangement comprises a relatively large number of individual components and in manufacture requires many processing steps, using various connecting processes. For the most part, the individual components must be manually positioned relative to one another and then assembled, so that automation is possible only with major effort, at considerable cost.

ADVANTAGES OF THE INVENTION

According to the invention, the interference suppressor of the DC motor has at least one leadthrough capacitor, which is located in an electrical path of at least one connection line. Leadthrough capacitors are known from the prior art and will not be described further detail here. It will merely be noted that leadthrough capacitors are quadrupole capacitors, which for at least one terminal have two electromagnetically largely decoupled leads. The capacitor is located between the leads in such a way that a capacitive coupling is brought about between the two leads. According to the invention, two poles of one of the leads of the leadthrough capacitor are connected to the same potential, in particular a ground potential, while the other lead carries the useful current. In this way, the aforementioned interference suppressor can be manufactured especially simply, using standard electronic components and standard technologies.

In an advantageous embodiment, the interference suppressor has a ground plate which is associated with the leadthrough capacitor. Such an arrangement improves the interference suppression properties of the interference suppressor and offers good capabilities of securing or locating the leadthrough capacitor. Hence it is preferable to embody a tub as a lead-in on the ground plate, the leadthrough capacitor being inserted into the ground plate and contacted with it and then potted in protective fashion. The subjection of the ground plate to a ground potential can be done in manifold ways, for instance by means of a cable or by means of direct contact with an element that carries ground potential.

The interference suppressor is advantageously associated with the pole housing opening, in particular being inserted. The result is especially favorable positioning of the interference suppressor, since inside or outside the pole housing, only minimal additional installation space is needed for the interference suppressor. Furthermore, the proposed association of the interference suppressor is technologically advantageous, since the interference suppressor, because of its spatial extent, particularly when the aforementioned ground plate is used, also reduces and/or eliminates interference radiation originating in the motor. In addition, the aforementioned connection to a ground potential can thus be attained especially simply, since the pole housing as a rule is already connected to a ground potential.

The contact elements, particularly in the embodiment as carbon contacts or carbon brushes, are advantageously connected to the connection lines in form- and/or force-locking fashion. It is especially preferred that the carbon brushes be pressed against the connection lines; then the pigtail cord of a contact element or of a carbon brush can also be used as a connection line of the interference suppressor.

In an advantageous refinement of the invention, the ground plate is embodied with retaining elements, especially sheet-metal tabs, for insertion, clamping, and/or plugging into the pole housing opening. It is especially advantageous if the ground plate has resilient sheet-metal tabs on its outer edges, the sheet-metal tabs being shaped such that they are secured to the pole housing with initial tension and thus assure a durable ground connection there.

For reducing sound transmission, the connection lines are advantageously embodied flexibly in at least some portions. Although it is possible to embody the connection lines as completely flexible, for the sake of acoustic decoupling it suffices to suppress sound transmission by means of flexible portions in the connection lines. Integrating mechanically flexible connection lines can be done especially through the pigtail cords of the contact elements or carbon brushes (flexible copper pigtail cord). The acoustic decoupling of DC motors is especially desirable in automotive technology for blower motors, which are often in constant operation during vehicle operation.

It is preferable that a connection line (negative line) serving the purpose of connection to a negative voltage potential has an electrical contact with the ground plate. The ground connection of the connection line, leading out of the pole housing from the negatively polarized contact element, can be accomplished in the immediate vicinity of the DC motor. If the embodiment in which the ground plate is inserted into the pole housing opening is selected, then the interference suppression of the negative line takes place directly in or on the pole housing.

Advantageously, the ground plate has a connection tongue for electrical contacting and/or strain relief of the negative line. In particular, the ground plate has a stamping in the form of a bar (connection bar). This connection tongue or connection bar is needed in order to connect the connection line (for instance, carbon pigtail cord or copper pigtail cord) of the negative contact element electrically and at the same time relieve it mechanically with regard to strain. The strain relief is accomplished by providing that the connection line has a collar, which at least partly surrounds the connection line and firmly holds it in force-locking fashion. If a noninsulated connection line or a connection line that is stripped of insulation in some portions is used, then in this way the electrical contact between the connection line and the connection tongue is simultaneously established. If an insulated connection line is to be contacted, it is advantageous if the aforementioned collar has at least one pointed and/or sharp protrusion, which when the connection line becomes surrounded by the collar penetrates the insulating layer of the connection line and brings about the contacting with the conductor of the connection line. The aforementioned electrical connection and/or mechanical strain relief can be realized in particular in the form of a crimped, squeezed, welded, or soldered connection.

In a refinement of the invention, one leadthrough capacitor is associated with each connection line. As a result, the interference suppression of the interference suppressor can be improved. In a two-pole DC motor, this means that one leadthrough capacitor each is disposed in both the positive line and the negative line.

It should be pointed out that because of a further aspect, the DC motor of the invention can also be manufactured especially favorably. It is thus possible to manufacture the interference suppressor outside the DC motor and then locate it on the DC motor in the—at least partly—completed state. The integration can be carried out in particular so far that even before the interference suppressor is located on the DC motor, the negative line is connected to the connection tongue, and/or the contact elements are pressed against the connection lines. If the carbon brush is pressed against the aforementioned flexible connection line, then additional electrical connections are unnecessary. This makes manufacture easier and reduces the production costs for the DC motor.

In a preferred refinement, the interference suppressor is located on a holder, preferably a brush holder, and is connected electrically to the pole housing by means of contact portions. As a result, the interference suppressor can be procured preassembled with the holder, so that one assembly step is dispensed with. The interference suppressor is preferably located with two side walls in slits in a receptacle in the holder, and detent openings for detent hooks of the receptacle are preferably located in the side walls.

Simple and secure assembly of the leadthrough capacitor is obtained if the interference suppressor has a ground plate, in which at least one opening for the leadthrough capacitor is embodied, and the opening is preferably provided with tabs for inserting, centering and/or locking of the leadthrough capacitor.

The electrical contacting can be attained especially simply if the contact portions are located on spring tongues.

The invention furthermore relates to an electrical interference suppressor for an electrical device located in a housing, in particular for a DC motor in a pole housing, having a ground plate with sheet-metal tabs serving the purpose of fastening in a housing opening; a connection tongue serving the purpose of electrical contacting and/or strain relief of a connection line; a potted leadthrough capacitor secured to the ground plate; a first connection line portion, located on the connection side on the leadthrough capacitor; and a second connection line portion, located on the inside of the housing on the leadthrough capacitor.

Finally, the invention relates to the use of a leadthrough capacitor for interference suppression in a DC motor, in particular having one or more of the aforementioned characteristics.

DRAWINGS

Figure 2:
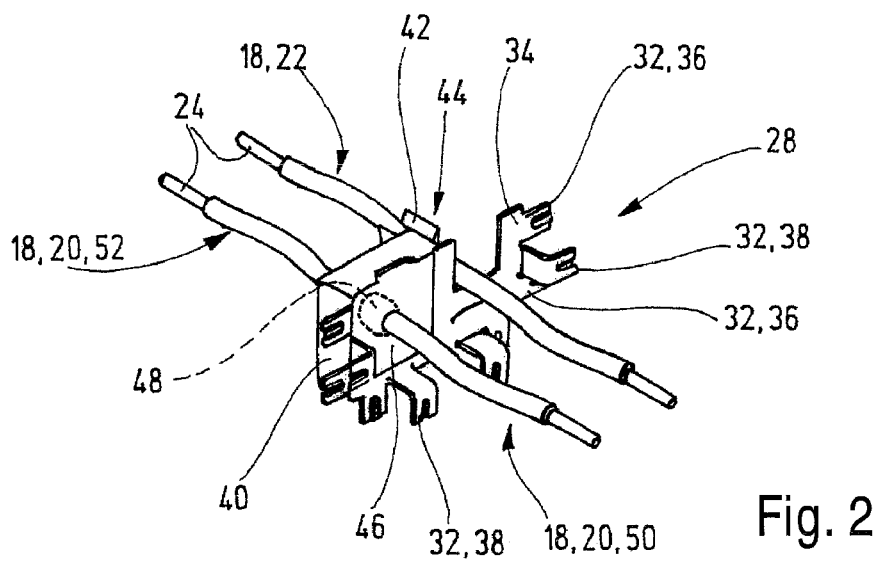
Figure 3:
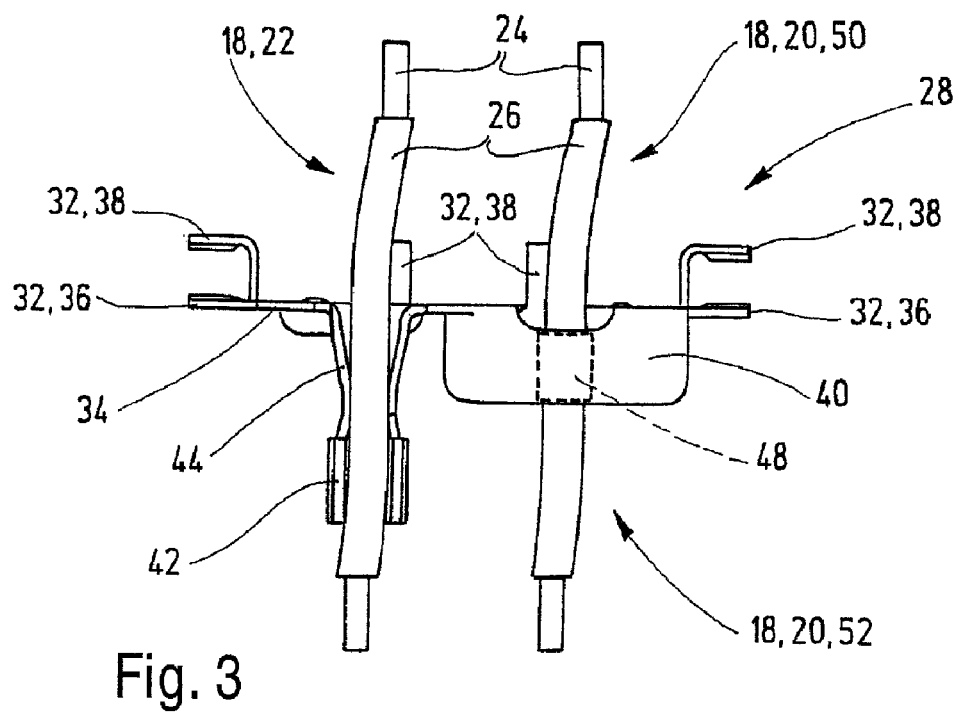
Figure 4:
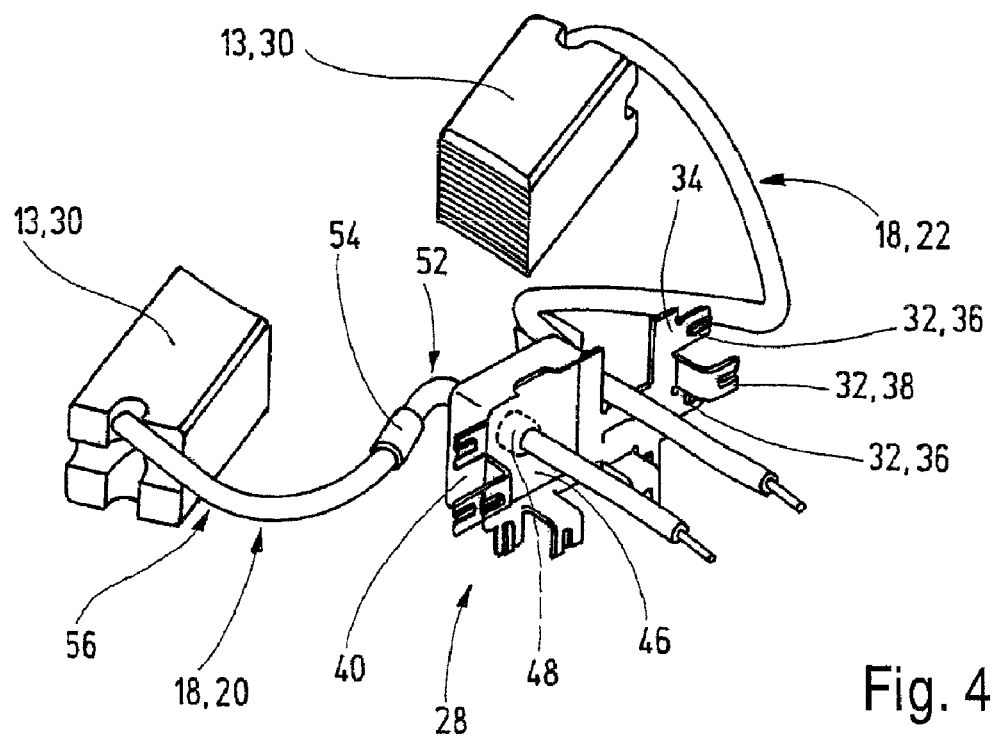
Figure 5:
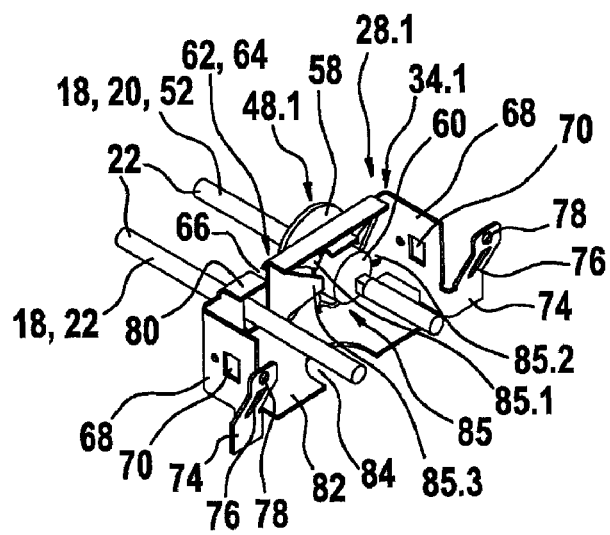
Figure 6:
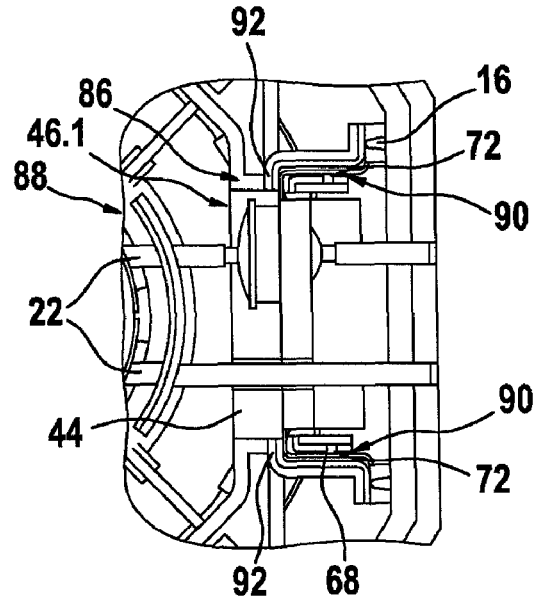
Figure 7:
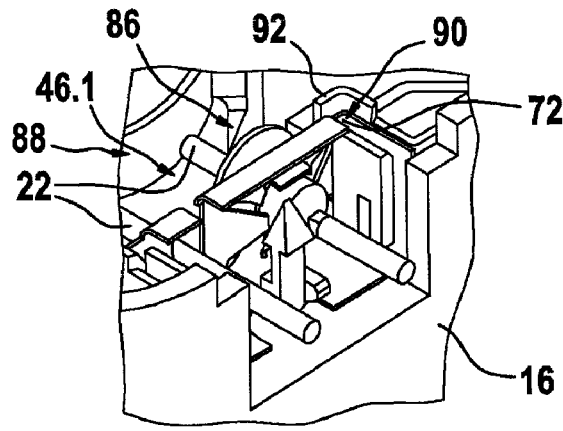

The invention will now be described in further detail in terms of exemplary embodiments. In the drawings:

FIG. 1 shows a DC motor;
FIG. 2 shows a detail of an interference suppressor;
FIG. 3 shows a detail of the courses of the connection lines;
FIG. 4 shows an interference suppressor with contact elements clamped to the connection lines;
FIG. 5 shows a detail of a modified interference suppressor;
FIG. 6 shows the modified interference suppressor in the assembled state; and
FIG. 7 shows the detail of FIG. 6 in perspective.

DESCRIPTION OF THE EXEMPLARY EMBODIMENTS

FIG. 1 shows a DC motor 1; only the elements relevant to the invention have been shown. It should be noted that FIG. 1 is not to scale, and that some components of the DC motor 1, in particular the stator, have not been shown for the sake of greater clarity. The DC motor 1 has the following elements: a pole housing 10, a collector 12 with a plurality of collector laminations 14, two contact elements 13 serving to contact the collector 12 and the collector laminations 14, a pole housing opening 16 for leading through electrical connection lines 18, namely a positive line 20 and a negative line 22, each of the connection lines 18 having a conductor 24 and an insulation 26 surrounding the conductor 24, and an interference suppressor 28 inserted into the pole housing opening 16. The basic mode of operation of a DC motor 1 is well known and will not be further explained here. It should merely be noted that during operation of the DC motor 1, or in other words when the collector 12 is rotating, the collector laminations 14 move past the contact elements 13, embodied here as carbon brushes 30, so that the contact elements 13 over the course of time have contact with different pairs of collector laminations 14. Especially during the change from one pair of laminations to the other, interference radiation and line-conducted interference signals occur. Since these interference signals propagate along the electrical connection lines 18 from the DC motor 1 and can interfere with an electrical system to which the DC motor 1 is connected, recourse to interference-suppressing provisions is necessary. This is achieved here by means of the interference suppressor 28, which is held in clamping fashion in the pole housing opening 16 by means of retaining elements 31, embodied here as sheet-metal tabs 32.

FIG. 2 shows a detail of the electrical interference suppressor 28. The interference suppressor 28 has the following components: a ground plate 34; sheet-metal tabs 32 embodied on the ground plate 34, of which inner sheet-metal tabs 36, with their approximately two-dimensional extents are located substantially in a first plane, and outer sheet-metal tabs 38, with their approximately two-dimensional extents, are located essentially in a second plane; a tub 40 embodied from the ground plate 34; a connection tongue 44, which by means of a collar 42 electrically contacts and strain relieves the negative line 22; and a leadthrough capacitor 48, which is embedded in a potting composition 46 and is electrically contacted with the ground plate 34. The positive line 20 is divided here into a first connection line portion 50, located on the connection side on the leadthrough capacitor 48, and a second connection line portion 52, located on the interior of the housing on the leadthrough capacitor 48. The negative line 22 has already been installed here; in other words, the negative line 22 was placed in the connection tongue 44 and firmly squeezed by squeezing of the collar 42.

The leadthrough capacitor 48 has been electrically wired as follows: The first pole of its first lead was connected to the first connection line portion 50, and the second pole of the first lead was connected to the second connection line portion 52. The two poles of the second leadthrough are in electrical contact with the tub 40 of the ground plate 34. An interference signal which propagates along the positive line 20 is damped or eliminated by the leadthrough capacitor 48, so that further conduction of the interference signal to the first connection line portion 50 is reduced or suppressed. Interference signals which propagate along the negative line 22 are diverted, by the contacting effected by means of the collar 42, to the electrical conductor 24 of the negative line 22 onto the ground plate 34, since the ground plate 34, with its connection to the ground of the total electrical system, can be considered a voltage sink for any voltage, including the voltage of the interference signals.

FIG. 3, in a top view on the interference suppressor 28, makes the course of the positive line 20 and the negative line 22 clear. It can be seen that the first connection line portion 50 is located on the connection side on the leadthrough capacitor 48. The connection side means that the first connection line portion 50 is associated with an energy source that supplies the DC motor 1 with energy. The second connection line portion 52 is connected to the leadthrough capacitor 48 on the interior of the housing. The negative line 22 contacts the connection tongue 44 and is fixed there by the collar 42.

A further exemplary embodiment is shown in FIG. 4. Here the contact elements 13 are clamped to the ends, on the inside of the housing, of the connection lines 18. In this exemplary embodiment, the positive contact element 13 was first provided with a contact element lead 56 and then connected electrically to the second connection line portion 52 via a connecting element 54. This initially two-part production, which is then followed by a connection step, may be advantageous, depending on the orientation of the production strategies. However, a one-piece production without the connecting element 54 can equally well be selected.

FIGS. 5, 6 and 7 show a modified interference suppressor 28.1, which includes a modified ground plate 34.1 and a leadthrough capacitor 48.1 that is known per se.

The leadthrough capacitor 48.1 includes a first cylindrical portion 58 and an adjoining cylindrical portion 60 of lesser diameter.

The ground plate 34.1 is essentially tub-shaped, with a substantially rectangular bottom 62. The bottom 62 has a first opening 64 for the leadthrough capacitor 48.1 and a second opening 66 for the negative line 22. The short sides of the bottom 62 are adjoined by two side walls 68, oriented perpendicular to the bottom 62 but parallel to one another. Detent openings 70 for retaining hooks 72 (FIG. 6) are embodied in the side walls 68. Portions 74 oriented away from one another and extending parallel to the bottom 62 protrude from the side walls 68 and are each adjoined by a respective spring tongue 76. The spring tongues 76 extend obliquely to the bottom 62 and in the unassembled state they extend away from it. On their ends, the spring tongues 76 have contact portions 78.

On the two long sides of the bottom 62, further side walls 80, 82 protrude at right angles to the bottom 62 but parallel to one another. The side wall 80 is not as high as the side wall 82. Moreover, the second opening 66 also extends through the side wall 80. The side wall 82 has a recess 84 on its edge remote from the bottom 62.

On their adjacent long sides, each of the side walls 68, 80, 82 are separated from one another by a slit 83, so that simple production by stamping and bending is possible. However, they may also be joined together, for instance if the ground plate 34.1 is deep-drawn.

The first opening 64, on its edges, has a plurality of obliquely protruding tabs 85.1, 85.2, 85.3, which are oriented into the interior of the ground plate 24.1. Four tabs 85.1 facing one another in pairs act as slanting insertion aids for the leadthrough capacitor 48.1. Two further tabs 84.2 diametrically opposite one another, which are preferably longer than the tabs 85.1 and protrude farther into the first opening 64, serve as a centering aid for the leadthrough capacitor 48.1. Two further diametrically opposed tabs 85.3, which are preferably longer than the tabs 85.2 and protrude even farther into the first opening 64, serve as barbs for the leadthrough capacitor 48.1. The leadthrough capacitor 48.1 is inserted into the ground plate 34.1 from the underside. Secure, positionally precise and shake-proof fastening of the leadthrough capacitor 48.1 is thus possible.

The ground plate 34.1 is secured in a receptacle 86 of a brush holder 88. Instead of the preferred brush holder 88, however, some other retaining element may be provided. After assembly, the interference suppressor 28.1 is held by the brush holder 88 in the region of the pole housing opening 16, through which the connection lines 18 are extended to the outside from the DC motor 1.

The receptacle 86 has two parallel slits 90, in which the side walls 68 are retained by means of the retaining hooks 72 and the detent openings 70. The slits 90 extend perpendicular to the pole housing opening 16. On their ends remote from the pole housing opening 16, they are adjoined by walls 92, which extend perpendicular to the slits 90 and which contact the bottom 62 of the ground plate 34.1, as a result of which the contact portions 78 are pressed against the pole housing 10. The spacing of the walls 92 from the pole housing 10 is less than the spacing of the contact portions 78 from the bottom 62 in the uninstalled state of the ground plate 34.1. As a result, the contact portions 78 are pressed securely against the pole housing 10, and an electrical contact is made. In this respect, the contact portions 78 and spring tongues 76 are retaining elements in the form of sheet-metal tabs, for clamping the ground plate 24.1 to the pole housing opening 16.

The interference suppressor 28.1 rests axially with the side wall 82 on the brush holder 88. A bearing hoop, not shown, comes to rest on the side wall 80, and as a result the interference suppressor 28 is fixed. A dome 94 of the brush holder 88 protrudes through the recess 84.

The invention claimed is:

1. A DC motor (1), in particular for a blower device of a motor vehicle, having a pole housing (10), a plurality of contact elements (13) effecting the bonding to a collector (12), a pole housing opening (16) making it possible to feed electrical connection lines (18) through into the pole housing (10), and an interference suppressor (28, 28.1) serving to reduce and/or eliminate line-conducted electrical interference signals, characterized in that the interference suppressor (28, 28.1) has at least one leadthrough capacitor (48, 48.1) that is located in an electrical path of at least one connection line (18), which is embodied flexibly in at least some portion in order to reduce sound transmission and has a ground plate (34, 34.1) that is associated with the leadthrough capacitor (48, 48.1) and embodied with retaining elements (31) configured as sheet-metal tabs (32, 76) for one of insertion, clamping, and plugging into the pole housing opening (16).

2. The DC motor (1) as defined by claim 1, characterized in that the interference suppressor (28, 28.1) is associated with the pole housing opening (16).

3. The DC motor (1) as defined by claim 1, characterized in that the contact elements (13), particularly in the embodiment as carbon contacts or carbon brushes (30), are connected to the connection lines (18) in form- and/or force-locking fashion.

4. The DC motor (1) as defined by claim 1, characterized in that a connection line (22)(negative line) serving the purpose of connection to a negative voltage potential has an electrical contact with the ground plate (34, 34.1).

5. The DC motor (1) as defined by claim 4, characterized in that the ground plate (34, 34.1) has a connection tongue (44) for electrical contacting and/or strain relief of the negative line (22).

6. The DC motor (1) as defined by claim 1, characterized in that one leadthrough capacitor (48) is associated with each connection line (18).

7. The DC motor (1) as defined by claim 1, characterized in that the interference suppressor (28.1) is located on a holder (88), preferably a brush holder, and is connected electrically to the pole housing (16) by means of contact portions (78).

8. The DC motor (1) as defined by claim 7, characterized in that the interference suppressor (28.1) is located with two side walls (68) in slits (90) in a receptacle (88) in the holder (88), and detent openings (70) for detent hooks (72) of the receptacle (88) are preferably located in the side walls (68).

9. The DC motor (1) as defined by claim 7, characterized in that the interference suppressor (28.1) has a ground plate (34.1), in which at least one opening (64) for the leadthrough capacitor (48.1) is embodied, and the opening (64) is preferably provided with tabs (85.1, 85.2, 85.3) for inserting, centering and/or locking of the leadthrough capacitor (48.1).

10. The DC motor (1) as defined by claim 7, characterized in that the contact portions (78) are located on spring tongues (76).

11. An electrical interference suppressor (28, 28.1) for an electrical device located in a housing, in particular for a DC motor (1) in a pole housing (10), characterized by a ground plate (34, 34.1) with sheet-metal tabs (32, 76) serving the purpose of fastening in a housing opening (16) by one of insertion, clamping and plugging, by a connection tongue (44) serving the purpose of electrical contacting and/or strain relief of a connection line (18) through into the pole housing, by a preferably potted leadthrough capacitor (48, 48.1) secured to the ground plate (34), by a first connection line portion (50), located on the connection side on the leadthrough capacitor (48, 48.1), and by a second connection line portion (52), located on the inside of the housing on the leadthrough capacitor (48, 48.1), wherein at least some portion of connection line (18) is embodied flexibly to reduce sound transmission.

12. The use of a leadthrough capacitor (48, 48.1) for interference suppression in a DC motor (1), in particular as defined by claim 1.

* * * * *